United States Patent
Chambers et al.

[11] Patent Number: 5,870,570
[45] Date of Patent: Feb. 9, 1999

[54] MULTIPLE BUS AGENT INTEGRATED CIRCUIT DEVICE FOR CONNECTING TO AN EXTERNAL BUS

[75] Inventors: Peter Chambers, Scottsdale; Edward Michael Petryk, Phoenix; George Parker Crouse, Chandler, all of Ariz.

[73] Assignee: VLSI Technology, Inc., San Jose, Calif.

[21] Appl. No.: 740,501

[22] Filed: Oct. 29, 1996

[51] Int. Cl.⁶ .............................. G06F 13/00; G06F 13/20
[52] U.S. Cl. ......................... 395/293; 395/287; 395/308; 395/281
[58] Field of Search .................................. 395/293, 281, 395/287, 308, 729, 309; 370/402

[56] References Cited

U.S. PATENT DOCUMENTS

| | | | |
|---|---|---|---|
| 5,396,602 | 3/1995 | Amini et al. | 395/293 |
| 5,555,383 | 9/1996 | Elazar et al. | 395/306 |
| 5,598,542 | 1/1997 | Leung | 395/297 |
| 5,625,824 | 4/1997 | Melo et la. | 395/728 |
| 5,640,519 | 6/1997 | Langendorf et al. | 395/291 |
| 5,682,483 | 10/1997 | Wu et al. | 395/281 |

*Primary Examiner*—Gopal C. Ray
*Attorney, Agent, or Firm*—Wagner,Murabito&Hao

[57] ABSTRACT

A multiple peripheral component interconnect (PCI) agent integrated circuit device for connecting to an external PCI bus. In one embodiment, the present multiple PCI agent integrated circuit device includes, an integrated circuit which is adapted to be coupled to an external PCI bus. The integrated circuit includes an internal PCI bus built in. The internal PCI bus is adapted to transmit data signals thereon, and is further adapted to couple to the external PCI bus via a connector. A plurality of PCI agents are built into the integrated circuit, wherein each of the plurality of PCI agents are capable of performing an independent function. Each of the plurality of PCI agents are coupled to the internal PCI bus. A predictive arbiter is built into the integrated circuit and is coupled to both the internal PCI bus and to the plurality of PCI agents. The predictive arbiter arbitrates between the PCI agents for ownership of the internal PCI bus.

18 Claims, 8 Drawing Sheets

MULTIPLE BUS AGENT INTEGRATED CIRCUIT DEVICE FOR CONNECTING TO AN EXTERNAL BUS

TECHNICAL FIELD

The present invention pertains to the field of computer system bus architectures. More particularly, the present invention relates to a bus architecture having a peripheral component interconnect (PCI) bus master device with a common interface between multiple PCI bus agents.

BACKGROUND ART

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In many hardware applications, such as, graphics adapters, full motion video adapters, small computer systems interface (SCSI) host bus adapters, and the like, it is imperative that large block data transfers be accomplished expeditiously. These applications are just some examples of subsystems which benefit substantially from a very fast bus transfer rate. In many computer system architectures of today, the majority of the above mentioned subsystems reside on the computer system's expansion bus.

The expansion bus is generally used as a method of adding functional components to the computer system. The functional components are coupled to the expansion bus to communicate and exchange information. Dedicated bus-based designs (designs specifically conceived to operate from an expansion bus) typically embody the functional components.

Traditionally, a separate and distinct function added to a computer system was performed by a dedicated bus-based design. The dedicated bus-based design (bus agent) embodied a complete device and was typically in the form of an expansion card. The expansion card containing the device (e.g., an audio device) was utilized by physically connecting the expansion card into one of a limited number of dedicated "slots" on the expansion bus. Additional functionality was added by simply installing additional expansion cards, with each additional expansion card embodying a distinct and separate function, thus, "expanding" the expansion bus. Soon, expansion bus architectures were specifically designed to provide for efficient expansion. The peripheral component interconnect (PCI) bus constitutes just such a expansion bus architecture, and has become an industry standardized, widely known, and widely used, expansion bus architecture.

Figure 1:
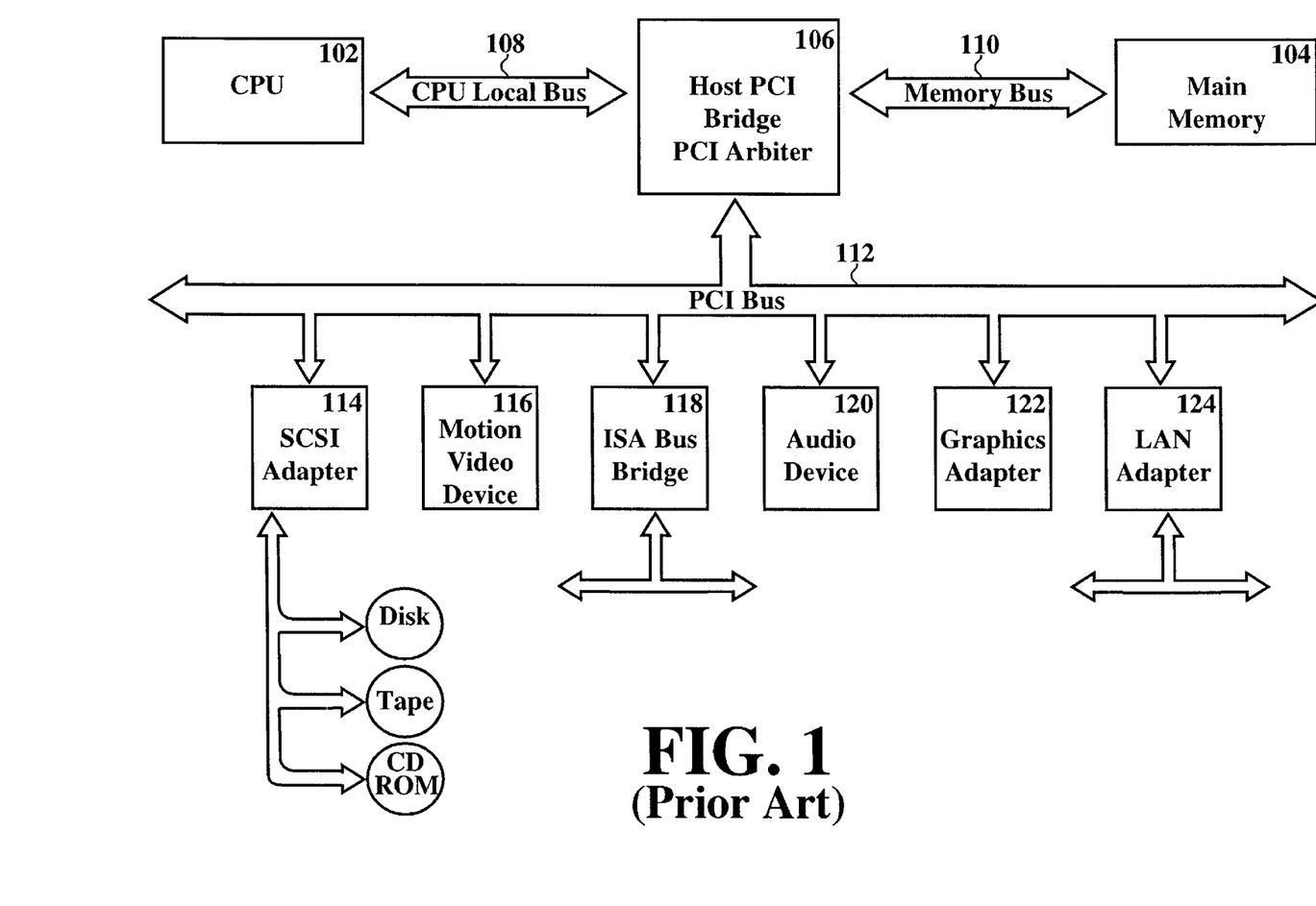
FIG. 1 shows a typical PCI bus architecture of the prior art.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is additionally coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, e.g., interface control lines, address/data lines, error signal lines, and the like. Each of PCI agents 114–124 are coupled to the functional signal lines comprising PCI bus 112. When one of PCI agents 114–124 requires the use of PCI bus 112 to transmit data, it requests PCI bus ownership from arbiter 106. Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates a transaction (e.g., data transfer) with a "target device" or destination device (e.g., main memory 104).

Figure 2:
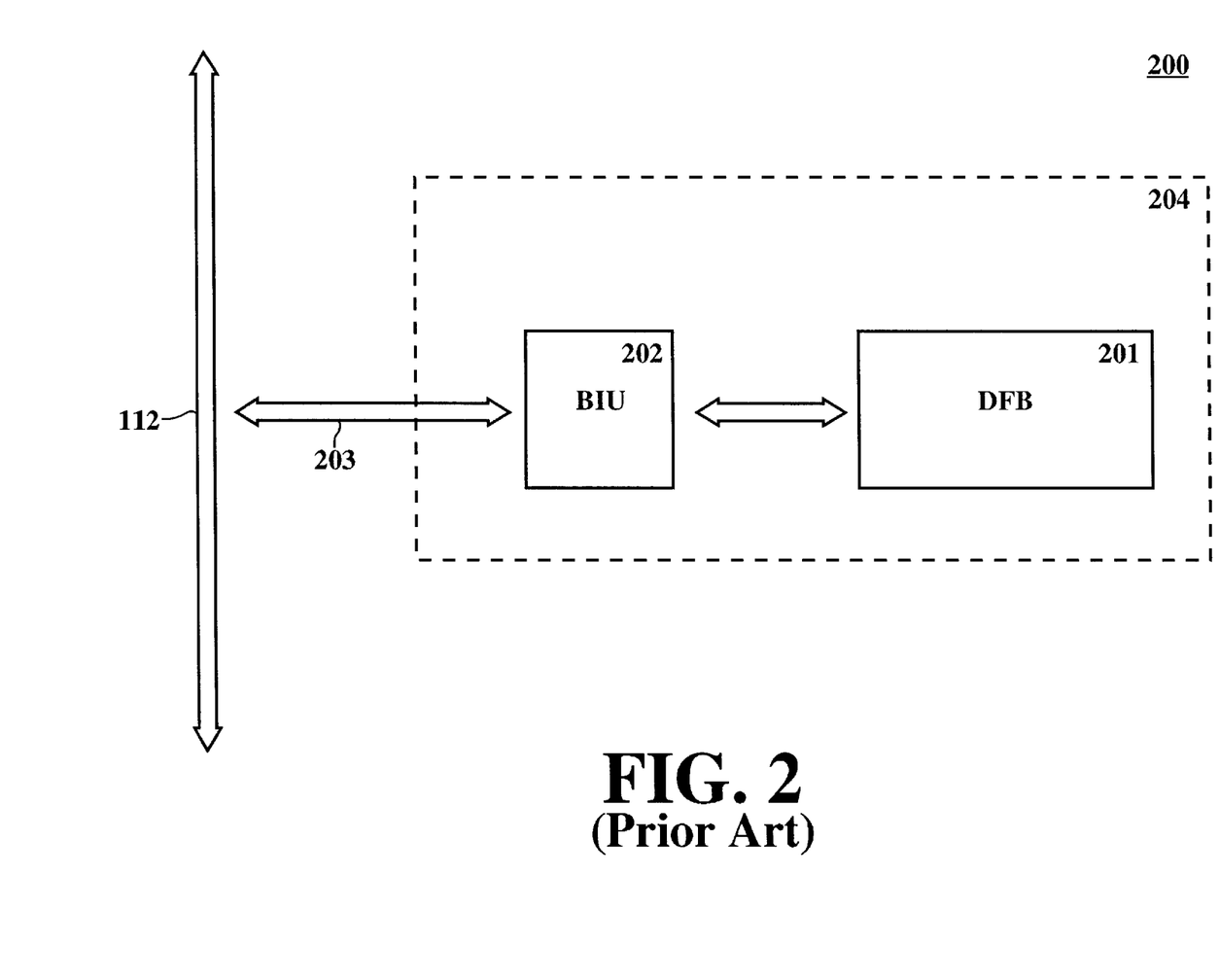
FIG. 2 shows an exemplary prior art PCI agent of the PCI bus architecture of FIG. 1.

Prior art FIG. 2 shows an exemplary PCI agent 200 of PCI bus architecture 100. PCI agent 200 includes a device functional block 201 coupled to a bus interface unit 202. The bus interface unit is, in turn, coupled via connector 203 to the PCI bus 112. The bus interface unit (BIU) 202 manages the signals and protocols which comprises the PCI specification and describe how PCI agents use a PCI bus. The device functional block (DFB) 201 actualizes the function or functions PCI agent 200 is designed to accomplish. DFB 201 includes the memory components, amplifiers, output drivers, and the like, required to implement the designed function. DFB 201 relies upon the BIU 202 to access PCI bus 112. The connector 203 couples the BIU 202 to the PCI bus 112. In so doing, the connector 203, and thus PCI agent 200, occupy one of the number of PCI slots of PCI bus 112.

Computer system users, however, soon discovered the PCI bus can usually support only a limited number of PCI agents. Once the limited number of PCI bus slots are occupied, it becomes expensive to add new PCI agents. If more PCI agents are desired, a hierarchical bridge to a subordinate PCI bus, which will accommodate its own set of PCI agents, is typically incorporated. The disadvantages of this solution include the added expense of the chipset implementing the PCI-to-PCI bridge function and the bus transfer latencies added to the PCI agents on the subordinate bus. Thus, many manufacturers have turned to systems and methods for sharing a single one of the limited number of PCI bus slots among multiple pre-existing PCI agents. Such systems and methods allow a previously designed, previously tested and debugged, and well known PCI agent, to be combined with other similar agents into a single multi-agent device.

Figure 3:
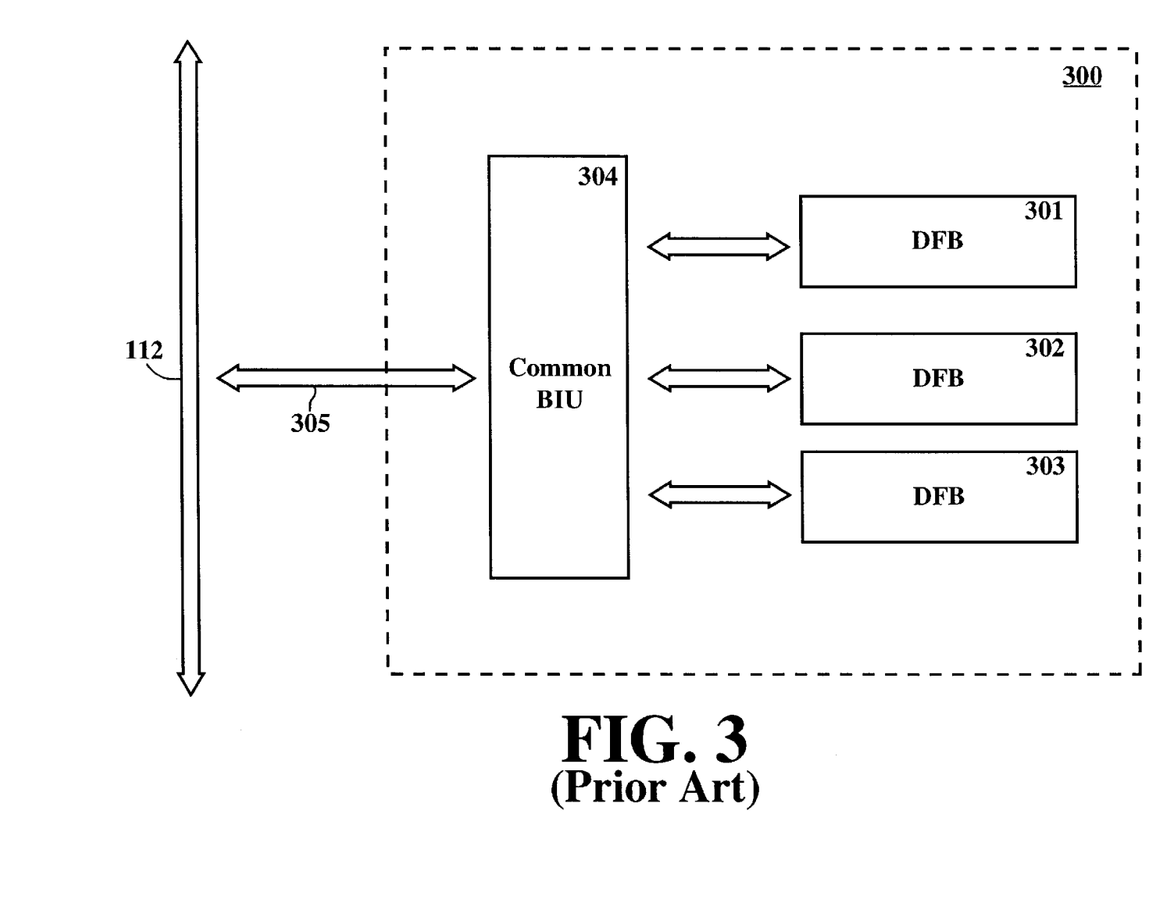
FIG. 3 shows a prior art multi-PCI agent device.

Prior art FIG. 3 shows one prior art multi-agent device 300 sharing a single PCI slot among multiple pre-existing PCI agents. Device 300 includes a plurality of DFBs 301, 302, and 303 (hereafter DFBs 301–303). Each of DFBs 301–303 are coupled to a common BIU 304. The common BIU 304 is coupled to PCI bus 112 via bus connector 305, thus occupying one of the limited number of PCI bus slots of PCI bus 112.

Device 300 was manufactured by combining a number of DFBs from other typical pre-existing prior art PCI agents (e.g., DFB 201 from PCI agent 200) into a multi-agent device 300. The combining process involves severing a pre-existing DFB of the PCI agent (e.g., DFB 201) from its dedicated BIU (e.g., BIU 202) and including that DFB with a plurality of DFBs in a new device, sharing a common BIU. Thus, in device 300, the DFBs 301–303 each share the common BIU 304. The DFBs 301–303, in order to function, need to properly interface with the PCI bus 112 and comply with the PCI specification. The common BIU 304 performs the necessary interfacing with PCI bus 112 such that each of DFBs 301–303 are able to access the PCI bus 112. The multi-agent device 300 comprises a PCI bus expansion board (i.e., an integrated circuit board) designed to couple to PCI bus 112 via connector 305. Many manufacturers, however, have recently taken advantage of the rapid progress of integrated circuit technology and have integrated multi-agent device 300 into a single semiconductor die. In such a case, multi-agent device 300 functions in the same manner but, due to the inherent advantages of circuit integration, occupies much less space and consumes much less power.

The combining process described above, and in particular the severing of an existing DFB from its dedicated BIU, tends to be a straight forward process, so long as the circuitry comprising the DFB and the circuitry comprising the BIU are distinct and share a minimum number of common elements. In numerous cases, however, the severing process can be very difficult. In these difficult cases, the circuitry and logic functions comprising the DFB and BIU are intimately commingled and interspersed. Examples of such cases include PCI agents including structural designs (e.g., netlist or very high level design language, VHDL) and designs translated from one high level design language to another (e.g., from VHDL to Verilog) which results in a set of very difficult to understand data files. In these difficult cases, redesigning the logic and the circuitry of the DFB from the pre-existing PCI agent to sever the DFB from the BIU is a tedious, error prone, and very time consuming process. In addition, each severed DFB resulting from the process tends to be different from other such severed DFBs. Thus, the process has historically required the careful dissection of the BIU the DFB in each PCI agent, followed by the creation of a customized common BIU which supports the plurality of functional blocks being combined.

What is required is a system which supports the direct connection of a plurality of PCI bus agents directly at the bus interface unit, thereby avoiding the whole severance process. Such a system should provide sufficient resources to ensure that the PCI bus protocols are complied with. What is further required is a system which effectively combines multiple pre-existing PCI agents into a single integrated circuit device. What is further required is a system which efficiently interfaces additional PCI agents without incurring the performance and expense penalties of adding a PCI-to-PCI bridge. The present invention effectively satisfies the above requirements.

DISCLOSURE OF THE INVENTION

A multiple peripheral component interconnect (PCI) agent integrated circuit device for connecting to an external PCI bus. In one embodiment, the present multiple PCI agent integrated circuit device includes an integrated circuit which is adapted to be coupled to an external PCI bus. The integrated circuit includes an internal PCI bus built in. The internal PCI bus is adapted to transmit data signals thereon, and is further adapted to couple to the external PCI bus via a connector. A plurality of PCI agents are built into the integrated circuit, wherein each of the plurality of PCI agents are capable of performing an independent function. Each of the plurality of PCI agents are coupled to the internal PCI bus. A predictive arbiter is built into the integrated circuit and is coupled to both the internal PCI bus and to the plurality of PCI agents. The predictive arbiter arbitrates between the PCI agents for ownership of the internal PCI bus. The present invention also includes an initialization device select decoder for distributing an initialization device select signal from the external PCI bus to an appropriate one of the plurality of PCI agents. In so doing, the initialization device select decoder properly interfaces initialization signals from the external PCI bus with the plurality of PCI agents.

Thus, the present invention includes a system for combining a plurality of separate PCI agents into a single integrated circuit design. The present invention readily permits the plurality of PCI agents to efficiently share access to both the internal PCI bus and the external PCI bus, since the internal PCI bus is coupled to the external PCI bus. Redesign is minimized by employing most of the existing design's circuitry and combining PCI agent resources directly at a PCI interface of each of the plurality of PCI agents. The system of the present invention supports the direct connection of a plurality of PCI bus agents directly at a bus interface unit in each of the plurality of PCI agents, thereby avoiding the problems of the prior art severance process. The system of the present invention provides sufficient resources to ensure PCI bus protocols are complied with. The system of the present invention also effectively combines multiple pre-existing PCI agents into the single integrated circuit. In addition, the system of the present invention combines the plurality of PCI agents such a manner that they present a single load to the external PCI bus. Thus, additional PCI agents are able to efficiently interface with the external PCI bus architecture without incurring the performance and expense penalties of using a PCI-to-PCI bridge.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention includes a system for combining a plurality of separate PCI agents into a single integrated circuit design with minimal effort. The multiple PCI agent integrated circuit device of one embodiment of the present invention includes an integrated circuit which is adapted to be coupled to an external PCI bus. The integrated circuit includes an internal PCI bus built in. The internal PCI bus is adapted to transmit data signals thereon, and is further adapted to couple to the external PCI bus via a connector. A plurality of PCI agents are built into the integrated circuit, wherein each of the plurality of PCI agents are capable of performing an independent function. Each of the plurality of PCI agents are coupled to the internal PCI bus. A predictive arbiter is built into the integrated circuit and is coupled to both the internal PCI bus and to the plurality of PCI agents. The predictive arbiter arbitrates between the PCI agents for ownership of the internal PCI bus. The predictive arbiter of the present invention permits the plurality of PCI agents to efficiently share access to the internal PCI bus and the external PCI bus, since the internal PCI bus is coupled to the external PCI bus. Redesign is minimized by employing most of the existing design's logic and combining PCI agent resources directly at a PCI interface of each of the plurality of PCI agents. The present invention and its benefits are described in greater detail below.

Figure 4:
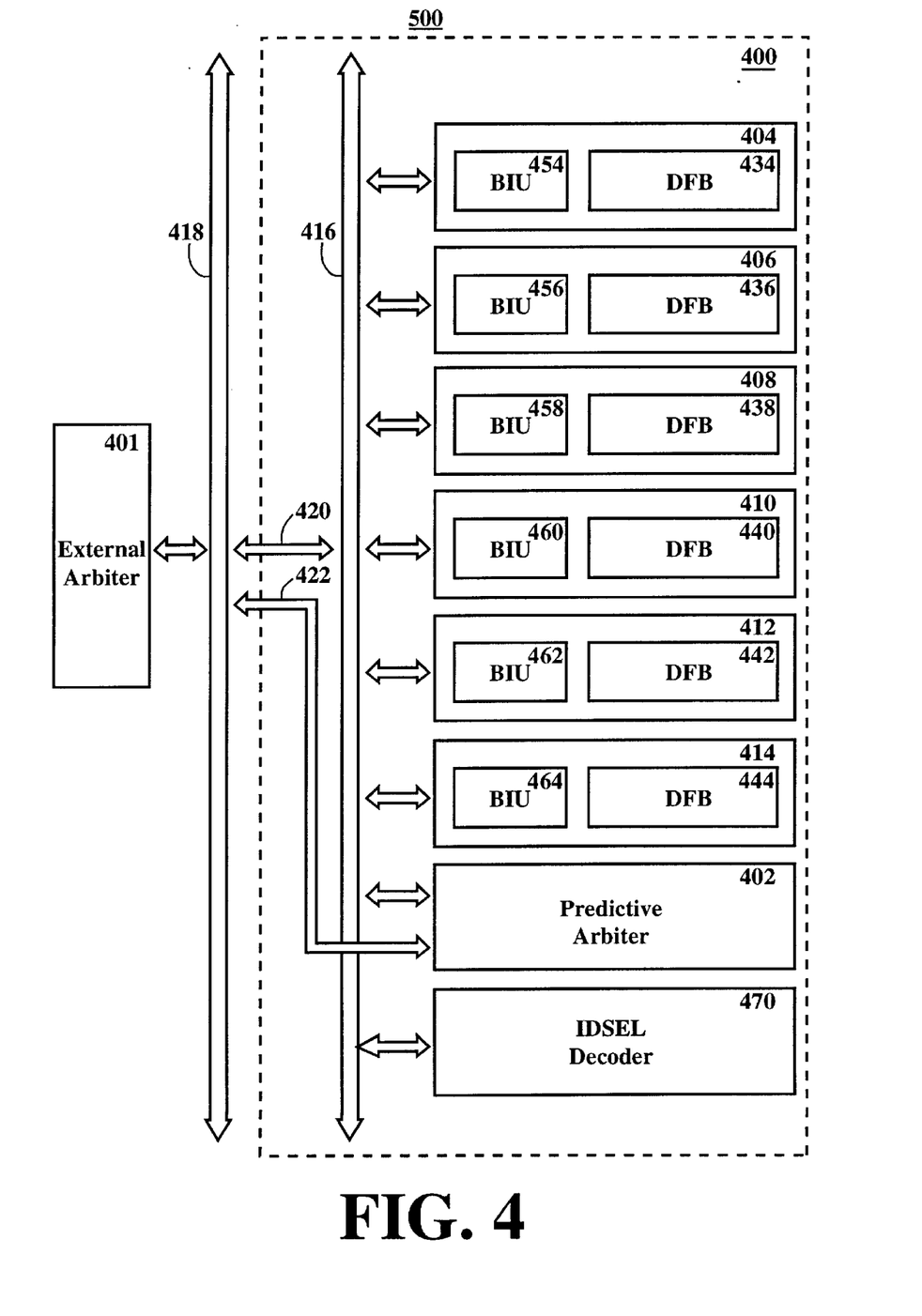
FIG. 4 shows a diagram of the components of a multiple PCI agent integrated circuit system in accordance with one embodiment of the present invention.

With reference now to FIG. 4, a schematic diagram illustrating components of a multiple PCI agent integrated circuit system 500 in accordance with one embodiment of the present invention is shown. In the present embodiment, the multiple PCI agent integrated circuit of the present invention comprises an integrated circuit (IC) 400 containing a predictive arbiter 402 coupled to a plurality of PCI agents 404, 406, 408, 410, 412, and 414 (hereafter PCI agents 404–414) via an internal PCI bus 416. The internal PCI bus 416 is coupled to an external PCI bus 418 via a bus connector 420. Bus connector 420 comprises a bus output driver unit such that an additional amount of signal loading from PCI agents 404–414 does not adversely affect the external PCI bus 418. Bus connector 422 couples the predictive arbiter 402 to the external PCI bus 418. An external arbiter 401 is also coupled to the external PCI bus 418 and is coupled to the predictive arbiter 402 via the external PCI bus 418.

The PCI agents 404–414 include respective bus interface units 454, 456, 458, 460, 462, and 464 (hereafter bus interface units 454–464). The bus interface units 454–464 are in turn coupled to respective device functional blocks 434, 436, 438, 440, 442, and 444 (hereafter device functional blocks 434–444). Thus, each of PCI agents 404–414 includes a device functional block coupled to a bus interface unit. The bus interface units (BIU) 454–464 manage the signals and protocols which comprises the PCI specification and describe how PCI agents 404–414 use the internal PCI bus 416. The device functional blocks (DFB) 434–444 actualize the functions PCI agents 404–414 are designed to accomplish. DFBs 434–444 include the memory components, amplifiers, output drivers, and the like, required to implement the designed function. DFBs 434–444 rely upon the BIUs 454–464 to access the internal PCI bus 416.

Thus, the present invention avoids the problems and difficulties associated with the prior art process of combining multiple PCI agents into a single device. Each of PCI agents 404–414 retains its respective original one of BIUs 454–464. In so doing, the process of severing the circuitry comprising BIUs from the circuitry comprising DFBs is avoided. The multiple PCI agent integrated circuit system of the present invention eliminates the need to intricately and tediously separate commingled and interspersed BIU-DFB logic. Thus, the requirement for expensive and difficult redesigning of logic circuitry is also eliminated.

Using the multiple PCI agent integrated circuit system of the present invention, manufacturers can integrate existing PCI agent designs into a single comprehensive design with very little effort in comparison to the combining process of the prior art. Redesign is minimized because the system of the present invention allows the subsequent reuse of a very large percentage of an existing PCI agent design. Thus, it should be appreciated that the existing PCI agent's design data can be essentially "dragged and dropped" from a previous existing data base (defining the existing PCI agent design) into a data base in accordance with the present invention in a rapid and expedient fashion. The data base in accordance with the present invention, including the "dragged and dropped" design data defining the existing PCI agent design, is subsequently manufactured, resulting in a device in accordance with the IC 400 of the present embodiment.

Thus, through the process described above, any of PCI agents 404–414 could have originated as a pre-existing PCI agent device. Additionally, any of PCI agents 404–414 can be a completely original design. It should be appreciated that from the perspective of PCI agents 404–414, the internal PCI bus 416 is indistinguishable from the external PCI bus 418, or any other PCI specification compliant bus. PCI agents 404–414 interact and interface with PCI bus 416 in the same manner, regardless of whether the PCI agents 404–414 are integrated into the IC 400, or each reside on separate expansion cards. In order to accomplish a seamless interface of PCI agents 404–414, which reside on the internal PCI bus 416, with the external PCI bus 418, several "boundary conditions" need to be managed. These boundary conditions and their specifics are described in greater detail below.

A first boundary condition to be managed is the interfacing of the PCI agents 404–414 bus ownership protocols. The multiple PCI agent integrated circuit (IC) 400 of the present invention interfaces the plurality of PCI agents 404–414 coupled to the internal PCI bus 416 with the external PCI bus 418. The internal PCI bus 416 and the external PCI bus 418 are logically coupled together. As such, at any given instant, there is only one PCI agent driving either the internal PCI bus 416 or the external PCI bus 418. Thus, the predictive arbiter 402 and the external arbiter 401 cooperatively select which PCI agent will receive ownership of the internal PCI bus 416 and external PCI bus 418 (hereafter referred to as PCI busses). This is accomplished through shared management of the request signal and the grant signal defined by the PCI specification. The shared management of the request signal and grant signal is described in detail below.

Referring still to FIG. 4, read and write transfers over the PCI busses are performed using burst transfers consisting of a single address phase followed by two or more data phases. A PCI agent granted ownership of the PCI busses (an initiating PCI agent) only has to arbitrate once for ownership. The start address and the transaction type are issued by the initiating PCI agent during an address phase. The target PCI agent latches the start address into an address counter and is responsible for incrementing the address from data phase to data phase, resulting in a fast and efficient transfer of data from the initiating PCI agent to the target PCI agent. The length of the burst is communicated between the initiating PCI agent and target PCI agent and may be of any length. The PCI bus specification standardizes the basic rules PCI agents follow in acquiring, using, and relinquishing the PCI busses. When an initiating PCI agent requires the use of the PCI busses to perform a data transfer, it arbitrates for ownership. The plurality of PCI agents 404–414 coupled to the internal PCI bus 416 request ownership of the PCI busses by signaling the predictive arbiter 402 via the internal PCI bus 416. In the same manner, an initiating PCI agent (not shown) coupled to the external PCI bus 418 requests ownership of the PCI busses by signaling the external arbiter 401 via the external PCI bus 418.

In the multiple PCI agent integrated circuit system 500, the external arbiter 401 interfaces with the predictive arbiter 402 of the IC 400 as if the predictive arbiter 402 where one initiating PCI agent among other initiating PCI agents (not shown) coupled to the external PCI bus 418. The predictive arbiter 402 requires a grant of ownership of the PCI busses from the external arbiter 401 in order to subsequently grant ownership of the PCI busses to one of the plurality of PCI agents 404–414. The PCI specification does not define the method used by the external arbiter 401 to decide among competing initiating PCI agents, thus, the arbitration algorithm used by the external arbiter 401 is often system specific. When the external arbiter 401 determines that it is a certain initiating PCI agent's turn to use the PCI busses, it signals that initiating PCI agent via the external PCI bus 418 (i.e., asserting that initiating PCI agent's GNT# line to signal a grant of bus ownership). It should be appreciated that the external arbiter 401 may deassert an initiating PCI agent's GNT# on any PCI clock edge. If GNT# is deasserted and an initiating PCI agent is in the midst of a data transaction, that current transaction is valid and the transfer will continue. The deassertion of GNT# by the external arbiter 401 indicates that the initiating PCI agent will no longer own the bus at the completion of the transaction currently in progress. Thus, the initiating PCI agent maintains ownership of the PCI busses while the current transaction is still in progress and signals the other initiating PCI agents when completing the final data transfer of the current transaction. The GNT# to one initiating PCI agent can be deasserted simultaneously with the assertion of another initiating PCI agent's GNT# if the PCI busses are not in an idle state. The second initiating PCI agent starts a transaction when the bus becomes idle.

Referring still to FIG. 4, the plurality of PCI agents 404–414 arbitrate for ownership of the PCI busses transparently, in that they make no distinction between the internal PCI bus 416 or the external PCI bus 418, or between the predictive arbiter 402 and the external arbiter 401. Each of the plurality of agents 404–414 follow the rules defined by the PCI specification and arbitrate for PCI bus ownership. The predictive arbiter 402 of the present invention insures they interface properly. The predictive arbiter 402 of the present invention arbitrates among the initiating PCI agents residing on the internal PCI bus 416. The predictive arbiter 402 allows the plurality of PCI agents on the internal PCI bus 416 to share the request and grant signal pair from the external arbiter 401, and thus, share the logically coupled internal PCI bus 416 and external PCI bus 418. The predictive arbiter 402 arbitrates between requests from the plurality of PCI agents 405–414 and issues a resulting request to the external arbiter 401. When the grant signal from the external arbiter is returned, the predictive arbiter 402 routes the grant signal to the selected PCI agent. If the PCI busses are idle, the selected PCI agent immediately begins its data transaction.

Figure 5:
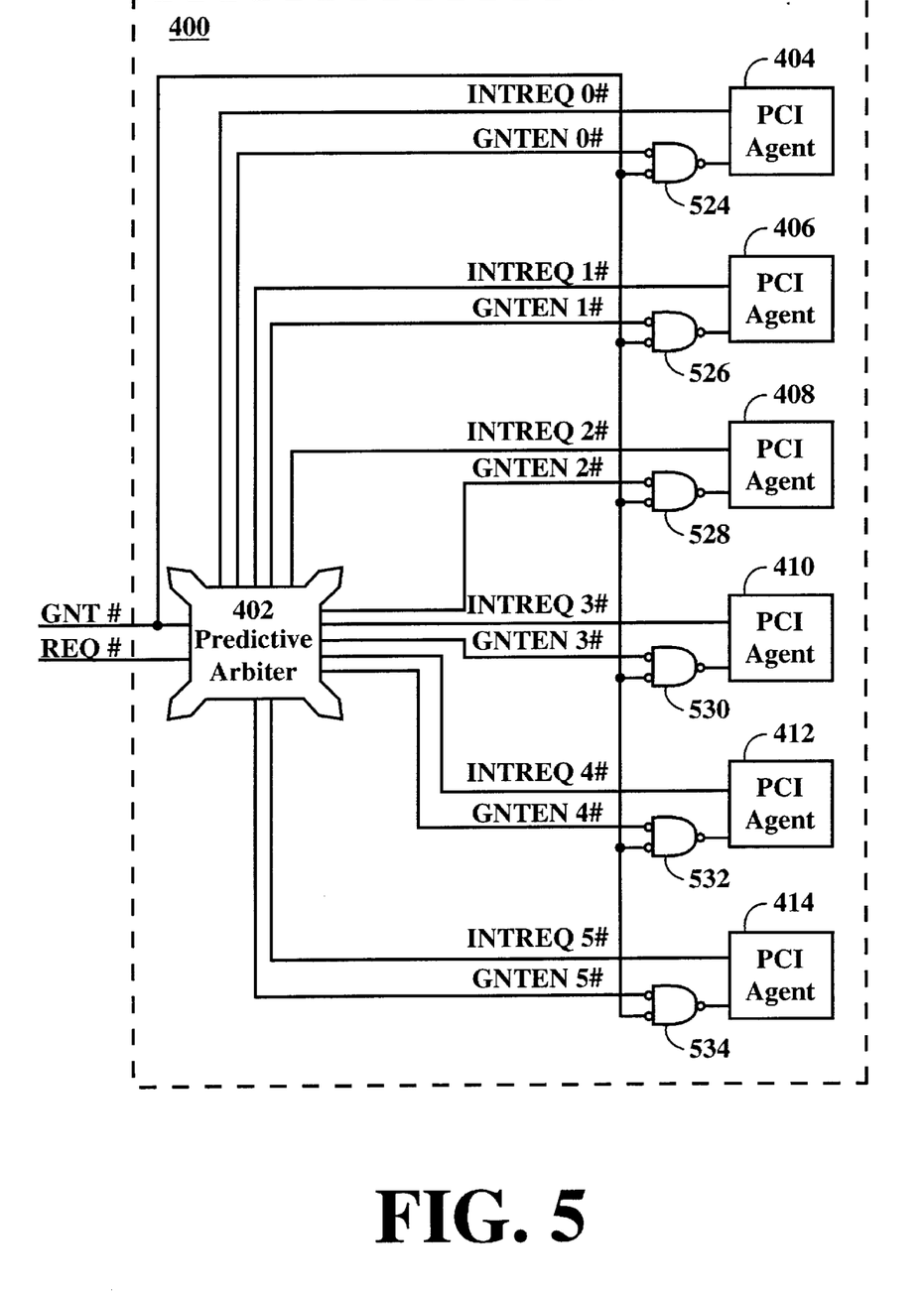
FIG. 5 shows a diagram of a predictive arbiter in accordance with one embodiment of the present invention.

FIG. 5 shows a more detailed diagram of the predictive arbiter 402 of IC 400. In the present embodiment, the predictive arbiter 402 is coupled to the plurality of PCI agents 404–414 via respective internal request lines INTREQ0#, INTREQ1#, INTREQ2#, INTREQ3#, INTREQ4#, and INTREQ5# (hereafter internal request lines) and grant enable lines GNTEN0#, GNTEN1#, GNTEN2#, GNTEN3#, GNTEN4#, and GNTEN5# (hereafter grant enable lines). The grant enable lines couple to PCI agents 404–414 via respective active low AND gates 524, 526, 528, 530, 532, and 534 (hereafter active low AND gates 524–534). Predictive arbiter 402 is coupled to a second arbiter 401 (not shown) via grant line GNT# and request line REQ#. Grant line GNT# is also coupled to PCI agents 404–414 via active low AND gates 524–534. The predictive arbiter 402 arbitrates between requests from the plurality of PCI agents 404–414 and issues a resulting request to the external arbiter 401. When the grant signal from the external arbiter is returned, the predictive arbiter 402 routes the grant signal to the selected PCI agent by asserting the selected PCI agent's respective one of the grant enable lines. The selected PCI agent subsequently receives the grant signal from the external arbiter 401 via its respective one of the active low AND gates 524–534. If the PCI busses are idle, the selected PCI agent immediately begins its data transaction, as described above. Thus, the first boundary condition is successfully managed.

A second boundary condition to be managed is the interfacing of the PCI agents 404–414 initialization device select (IDSEL) signals. The IDSEL signal is a configuration signal of the PCI busses and is an input to each of PCI agents 404–414. IDSEL is used to access device configuration registers, a set of which reside in each of PCI agents 404–414. The IDSEL signal needs to be received from the external PCI bus 418 and subsequently distributed to each of PCI agents 404–414. The distribution of IDSEL is described in greater detail below.

Figure 6:
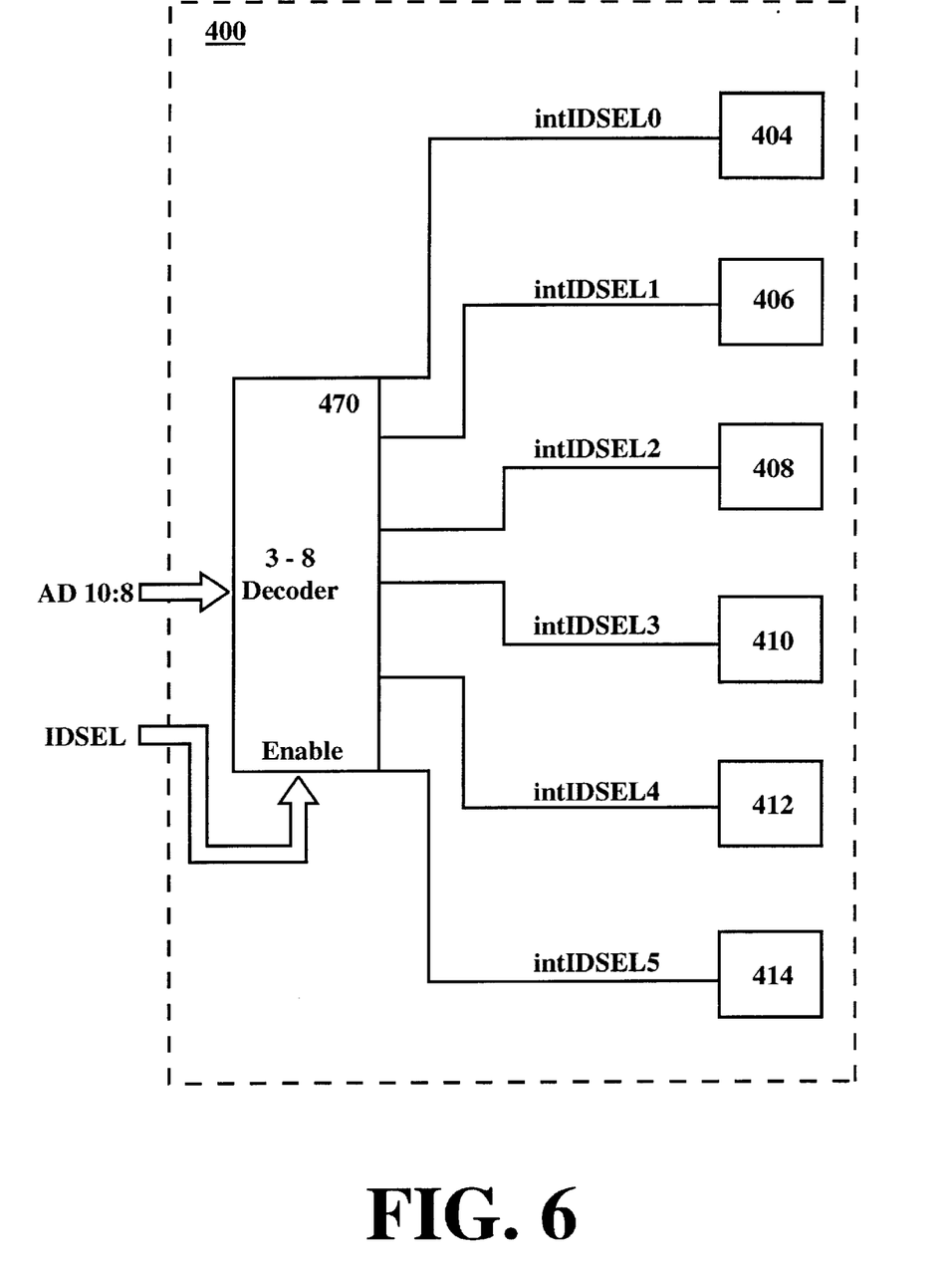
FIG. 6 shows a diagram of an identification device select decoder in accordance with one embodiment of the present invention.

FIG. 6 shows an IDSEL decoder 470, of IC 400, in accordance with one embodiment of the present invention. Decoder 470 is coupled to the external PCI bus 418 (not shown) via address/data lines 10 through 8 (AD10:8) and an IDSEL signal line. IDSEL decoder 470 is also coupled to each of PCI agents 404–414 via a respective internal IDSEL signal line, intIDSEL0, intIDSEL1, intIDSEL2, intIDSEL3, intIDSEL4, and intIDSEL5 (hereafter internal IDSEL lines).

The incoming IDSEL signal line is used by the IDSEL decoder 470 to enable one of the internal IDSEL lines coupled to the respective PCI agents 404–414. The IDSEL decoder 470 selects the one of the internal IDSEL lines to assert by decoding the address/data lines AD10:8. The address/data lines AD10:8 constitute a portion of the PCI address for the PCI agents 404–414. When IDSEL is asserted on the external PCI bus 418, it enables the output drivers within the IDSEL decoder 470 and coupled to the internal IDSEL lines. The IDSEL decoder 470 then asserts the appropriate decoded internal IDSEL line. It should be noted that the IDSEL decoder 470 is a "3 to 8" decoder. As such, the IDSEL decoder 470 is able to support up to 8 PCI agents, even though only 6 PCI agents are connected in the present embodiment.

Referring still to FIG. 6, the assertion of IDSEL for a particular PCI agent indicates the particular PCI agent is the target of a configuration access. As such, the particular PCI agent subsequently transmits and receives configuration information, (e.g., with a configuration software running on a host microprocessor on the external PCI bus 418). For example, the configuration software reads the particular PCI agent's configuration registers in order to determine the nature of the particular PCI agent and the PCI agent's resource requirements. Thus, if the particular PCI agent requires usage of a PCI interrupt request line, the configuration software programs the particular PCI agent with routing information indicating which interrupt request line to use. Additionally, the particular PCI agent can indicate its latency tolerances, i.e., how quickly the particular PCI agent requires ownership of PCI bus 418 when it asserts an internal request signal. By decoding a portion of the address for each of PCI agents 404–414, the IDSEL decoder allows the single IDSEL line to be used by each of PCI agents 404–414, and thus, allows configuration accesses to each of PCI agents 404–414. In so doing, the second boundary condition is successfully managed.

As described above, the combining of the plurality of PCI agents 404–414 into IC 400 in accordance with the present invention implies that PCI bus 418 loading will increase due to the added number of PCI agents (i.e., PCI agents 404–414) accessing external PCI bus 418. However, it should be appreciated that IC 400, in accordance with the present invention, utilizes an internal bus (e.g., internal PCI bus 416) to service the additional loading "on-chip." In so doing, the additional loading is moved "inside" the output buffers in bus connection 420 (FIG. 4) of the IC 400, thus, input buffering the additional loading so as to present a single load to the external PCI bus 418. This greatly ameliorates the effects of the additional loading on external PCI bus 418. In addition, where IC 400 contains five or fewer PCI agents, there should be no concerns regarding any additional loading on external PCI bus 418.

Figure 7:
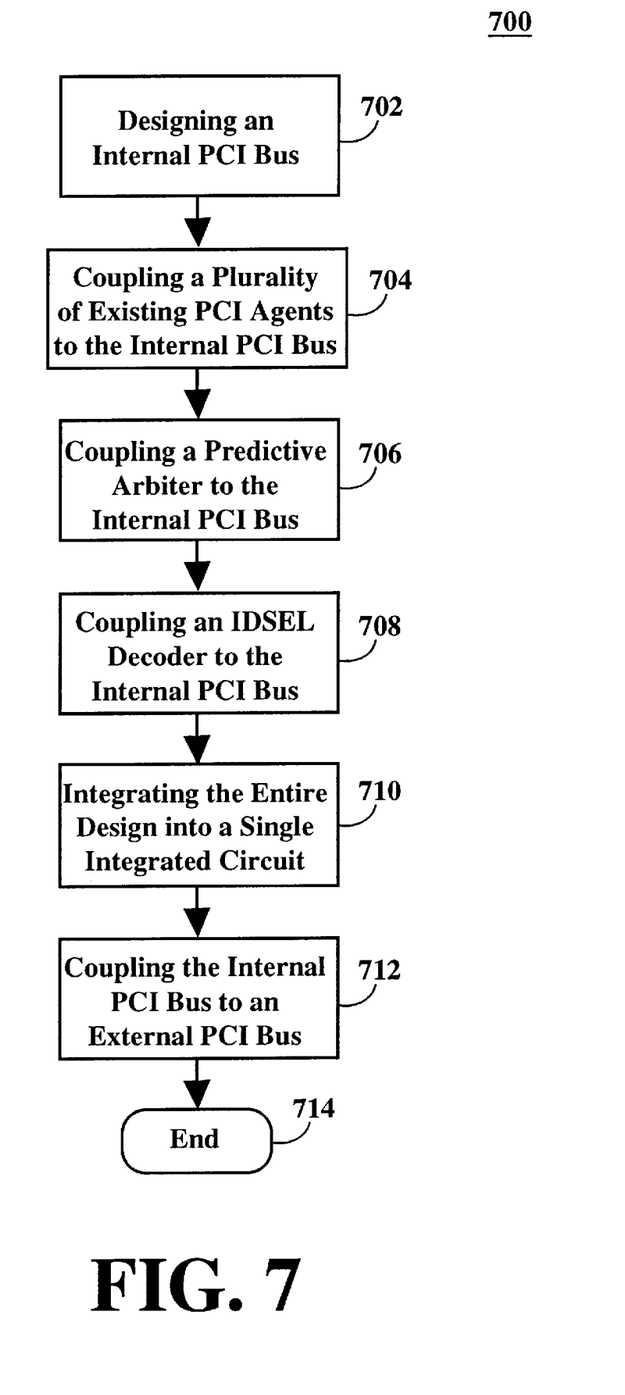
FIG. 7 shows a flow chart of the steps of the method of one embodiment of the present invention.

Referring now to FIG. 7, a flow chart of the steps of the method 700 of combining of a plurality of existing PCI agents into a multiple PCI agent integrated circuit device in accordance with one embodiment of the present invention is shown. In step 702, an internal PCI bus is designed and saved in an appropriate design database. In step 704, a plurality of pre-existing PCI agents (hereafter PCI agents) are coupled to the internal PCI bus. It should be appreciated that step 704 refers to the databases comprising the designs of each of the PCI agents, as opposed to the actual physical devices of the PCI agents. The pre-existing designs are coupled to the design of the internal PCI bus such that most of the pre-existing designs of the PCI agents are readily and easily utilized in an unchanged form, in the manner described above.

In step 706, the design of a predictive arbiter is coupled to the design of the internal PCI bus and is coupled to the PCI agents via the internal PCI bus. In step 708, the design of a IDSEL signal decoder is coupled to the design of the internal PCI bus and is also coupled to the PCI agents via the internal PCI bus. In step 710, the entire design (including the internal PCI bus, the PCI agents, the predictive arbiter, and the IDSEL decoder) is fabricated into a single integrated circuit. In step 712, the internal PCI bus of the integrated circuit is coupled to an external PCI bus of an external computer system. The method of the present embodiment ends in step 714.

Figure 8:
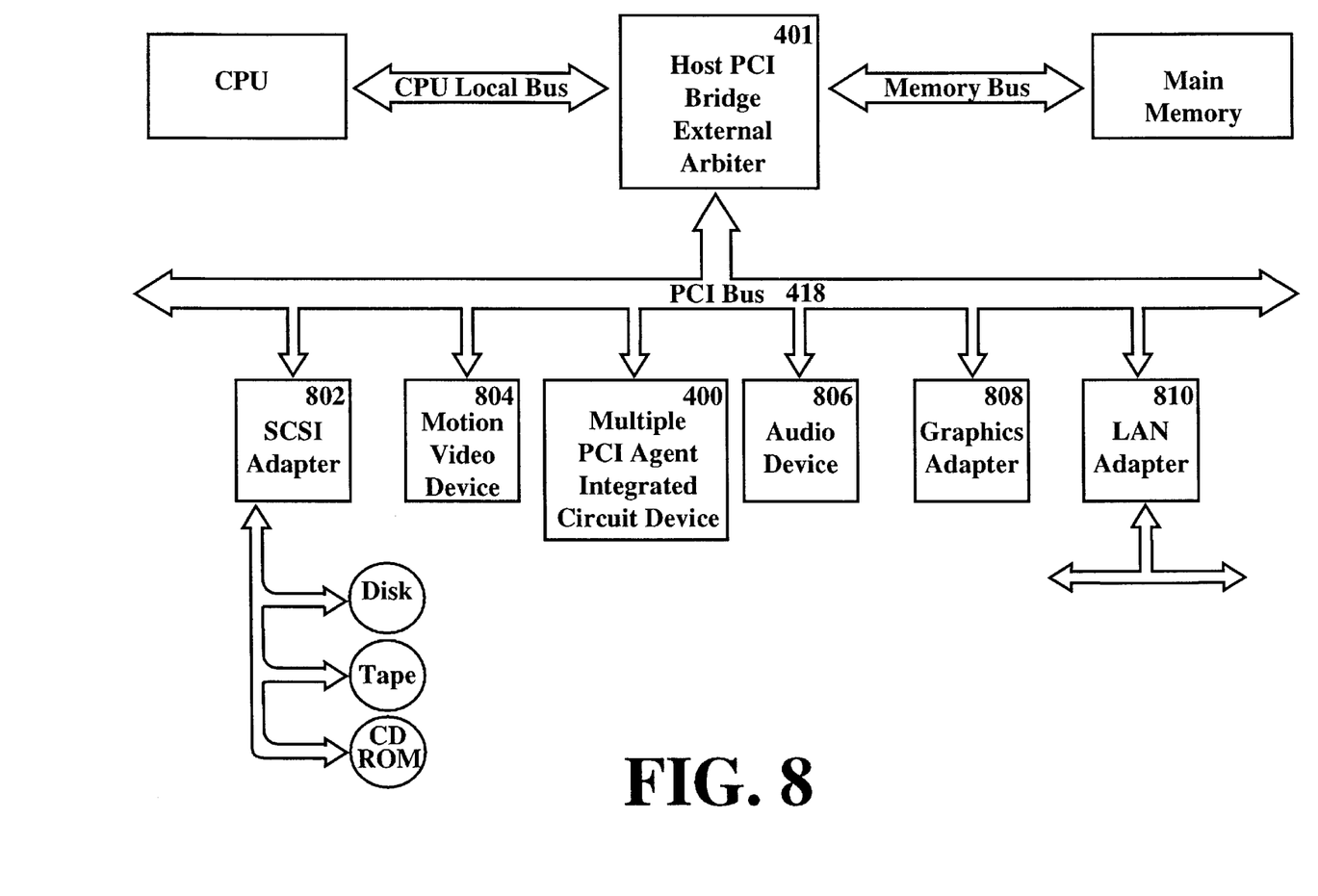
FIG. 8 shows a PCI bus architecture including a multiple PCI agent device in accordance with one embodiment of the present invention.

Referring now to FIG. 8, a PCI bus architecture 800 including the multiple PCI agent integrated circuit device 400 in accordance with one embodiment of the present invention is shown. The multiple PCI agent integrated circuit device 400 couples to the external arbiter 401 via the external PCI bus 418 in the manner described above. It should be appreciated that PCI bus architecture 800 includes not only the PCI agents 802, 804, 806, 808, and 810, PCI bus architecture 800 also includes the plurality of PCI agents 404–414 within the multiple PCI agent integrated circuit device 400. Thus, in the present embodiment, the multiple PCI agent integrated circuit device 400 effectively doubles the number of PCI agents available to PCI bus architecture 800, and does so without regard to the limitations of the host PCI bridge/external arbiter 401 chipset. In addition, the multiple PCI agent integrated circuit device 400 combines the plurality of PCI agents 404–414 such a manner that they present a single load to the external PCI bus 418.

Thus the present invention includes a system for combining a plurality of separate PCI agents into a single integrated circuit design with minimal effort. The present invention permits the plurality of PCI agents to efficiently share access to the internal PCI bus and the external PCI bus, since the internal PCI bus is coupled to the external PCI bus. Redesign is minimized by employing most of the existing design's circuitry and combining PCI agent resources directly at a PCI interface of each of the plurality of PCI agents.

The system of the present invention supports the direct connection of a plurality of PCI bus agents directly at the bus interface unit, thereby avoiding the problems of the prior art severance process. The system of the present invention provides sufficient resources to ensure the PCI bus protocols are complied with. The system of the present invention combines the plurality of PCI agents such a manner that they present a single load to the external PCI bus. In addition, the system of the present invention effectively combines multiple pre-existing PCI agents into a single integrated circuit device, thereby efficiently interfacing additional PCI agents to a PCI bus architecture without incurring the performance and expense penalties of adding a PCI-to-PCI bridge.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A multiple peripheral component interconnect (PCI) agent integrated circuit device for connecting to an external PCI bus, comprising:

an integrated circuit adapted to be coupled to an external PCI bus;

an internal PCI bus built into said integrated circuit, said internal PCI bus adapted to transmit data signals thereon, said internal PCI bus adapted to couple to said external PCI bus via a connector;

a plurality of PCI agents built into said integrated circuit, each of said plurality of PCI agents for performing a function, each of said plurality of PCI agents coupled to said internal PCI bus;

a predictive arbiter built into said integrated circuit, said predictive arbiter coupled to said internal PCI bus, said predictive arbiter coupled to said plurality of PCI agents for arbitrating between said PCI agents for ownership of said internal PCI bus; and an identification device select (IDSEL) decoder built into said integrated circuit, said IDSEL decoder coupled to said internal PCI bus, said IDSEL decoder coupled to said plurality of PCI agents via a corresponding plurality of internal IDSEL signal lines for routing an IDSEL signal to any one of said plurality of PCI agents.

2. The multiple PCI agent integrated circuit device of claim 1, further comprising:

said IDSEL decoder coupled to said external PCI bus, said IDSEL decoder adapted to decode a plurality of address-data lines from said external PCI bus to select said any one of said plurality of PCI agents, said IDSEL decoder adapted to receive said IDSEL signal from said external PCI bus to enable any one of said corresponding plurality of internal IDSEL signal lines such that said IDSEL signal is routed to said any one of said plurality of PCI agents.

3. The multiple PCI agent integrated circuit device of claim 1, further comprising an input buffering circuit included in said integrated circuit such that an additional amount of loading from said plurality of PCI agents is presented to said external PCI bus as a single load.

4. The multiple PCI agent integrated circuit device of claim 1, further comprising:

said internal PCI bus adapted to comply with a PCI bus specification with respect to interfacing with said plurality of PCI agents and with respect to said plurality of PCI agents interfacing with said external PCI bus via said internal PCI bus.

5. The multiple PCI agent integrated circuit device of claim 1, wherein said plurality of PCI agents further includes a plurality of pre-existing PCI agents.

6. The multiple PCI agent integrated circuit device of claim 5, wherein said plurality of pre-existing PCI agents are combined into said integrated circuit such that a large percentage of logic comprising each of said plurality of pre-existing PCI agents is built into said integrated circuit in an original condition.

7. The multiple PCI agent integrated circuit device of claim 6, wherein said large percentage of logic includes a respective plurality of bus interface units of said plurality of pre-existing PCI agents, said internal PCI bus adapted to couple to said plurality of pre-existing PCI agents via said respective plurality of bus interface units.

8. A multiple peripheral component interconnect (PCI) agent integrated circuit device for interfacing a plurality of PCI agents combined within the integrated circuit device to an external PCI bus, comprising:

an integrated circuit adapted to be coupled to an external PCI bus;

an internal PCI bus built into said integrated circuit, said internal PCI bus adapted to transmit data signals thereon, said internal PCI bus adapted to couple to said external PCI bus via a connector;

a plurality of PCI agents built into said integrated circuit, each of said plurality of PCI agents for performing a function, each of said plurality of PCI agents coupled to said internal PCI bus;

a predictive arbiter built into said integrated circuit, said predictive arbiter coupled to said internal PCI bus, said predictive arbiter coupled to said plurality of PCI agents for arbitrating between said PCI agents for ownership of said internal PCI bus; and an identification device select (IDSEL) decoder built into said integrated circuit, said IDSEL decoder coupled to said internal PCI bus, said IDSEL decoder coupled to said plurality of PCI agents via a corresponding plurality of internal IDSEL signal lines for routing an IDSEL signal to any one of said plurality of PCI agents.

9. The multiple PCI agent integrated circuit device of claim 8, wherein said plurality of PCI agents further includes a plurality of pre-existing PCI agents.

10. The multiple PCI agent integrated circuit device of claim 9, wherein said plurality of pre-existing PCI agents are combined into said integrated circuit such that a large percentage of logic comprising each of said plurality of pre-existing PCI agents is built into said integrated circuit in an original condition.

11. The multiple PCI agent integrated circuit device of claim 10, wherein said large percentage of logic includes a respective plurality of bus interface units of said plurality of pre-existing PCI agents, said internal PCI bus adapted to couple to said plurality of pre-existing PCI agents via said respective plurality of bus interface units.

12. The multiple PCI agent integrated circuit device of claim 8, further comprising:

said IDSEL decoder coupled to said external PCI bus, said IDSEL decoder adapted to decode a plurality of address-data lines from said external PCI bus to select said any one of said plurality of PCI agents, said IDSEL decoder adapted to receive said IDSEL signal from said external PCI bus to enable any one of said corresponding plurality of internal IDSEL signal lines such that said IDSEL signal is routed to said any one of said plurality of PCI agents.

13. The multiple PCI agent integrated circuit device of claim 8, further comprising an input buffering circuit included in said integrated circuit such that an additional amount of loading from said plurality of PCI agents is presented to said external PCI bus as a single load.

14. The multiple PCI agent integrated circuit device of claim 8, further comprising:

said internal PCI bus adapted to comply with a PCI bus specification with respect to interfacing with said plurality of PCI agents and with respect to said plurality of PCI agents interfacing with said external PCI bus via said internal PCI bus.

15. A method of combining multiple peripheral component interconnect (PCI) agents into an integrated circuit device for connecting to an external PCI bus, the method comprising the steps of:

a) designing an internal PCI bus adapted to couple to an external PCI bus;

b) coupling a plurality of pre-existing designs of a respective plurality of pre-existing PCI agents to said design of said internal PCI bus such that a large percentage of each of said plurality of pre-existing designs are reused in an unchanged condition;

c) designing a predictive arbiter coupled to said plurality of pre-existing designs;

d) designing an initialization device select decoder coupled to said plurality of pre-existing designs; and e) fabricating said internal PCI bus, said pre-existing PCI agents, said predictive arbiter, and said initialization device select decoder into a combined multiple PCI agent integrated circuit such that said pre-existing PCI agents can access said external PCI bus via said internal PCI bus.

16. The method of claim 15, wherein step b) further comprises the step of coupling said plurality of pre-existing designs to said design of said internal PCI bus at a respective plurality of bus interface units in each of said plurality of pre-existing designs.

17. A multiple bus agent integrated circuit device for interfacing a plurality of bus agents combined within the integrated circuit device to an external bus, comprising:

an integrated circuit adapted to be coupled to an external bus;

an internal bus built into said integrated circuit, said internal bus adapted to transmit data signals thereon, said internal bus adapted to couple to said external bus via a connector;

a plurality of bus agents built into said integrated circuit, each of said plurality of bus agents for performing a function, each of said plurality of bus agents coupled to said internal bus;

an arbiter built into said integrated circuit, said arbiter coupled to said internal bus, said arbiter coupled to said plurality of bus agents for arbitrating between said bus agents for ownership of said internal bus; and an identification device select decoder built into said integrated circuit, said identification device select decoder coupled to said internal bus, said identification device select decoder coupled to said plurality of bus agents via a corresponding plurality of internal identification device select decoder signal lines for routing an identification device select decoder signal to any one of said plurality of bus agents.

18. The multiple bus agent integrated circuit device of claim 17 wherein said plurality of bus agents are peripheral component interconnect (PCI) compliant.

* * * * *